US009629448B2

(12) United States Patent
Siedlack

(10) Patent No.: US 9,629,448 B2
(45) Date of Patent: Apr. 25, 2017

(54) MULTIPURPOSE LEVERAGING PAINT CAN HOLDER

(71) Applicant: James Siedlack, Valrico, FL (US)

(72) Inventor: James Siedlack, Valrico, FL (US)

( * ) Notice: Subject to any disclaimer, the term of this patent is extended or adjusted under 35 U.S.C. 154(b) by 0 days.

(21) Appl. No.: 14/571,161

(22) Filed: Dec. 15, 2014

(65) Prior Publication Data

US 2016/0166050 A1 Jun. 16, 2016

(51) Int. Cl.

| | |
|---|---|
| ***A47J 45/00*** | (2006.01) |
| ***A45F 5/10*** | (2006.01) |
| ***B67B 7/14*** | (2006.01) |

(52) U.S. Cl.

CPC .................. *A45F 5/10* (2013.01); *B67B 7/14* (2013.01); *A45F 2005/1006* (2013.01); *A45F 2200/0583* (2013.01)

(58) Field of Classification Search

CPC .................. A45F 5/10; A45F 2005/002; A45F 2005/1006; A45F 2200/0583; B67B 7/44; B67B 7/16; B67B 7/14; B65G 7/12

USPC .................................. 81/3.55; 7/151; D8/34

See application file for complete search history.

(56) References Cited

U.S. PATENT DOCUMENTS

| | | | | | |
|---|---|---|---|---|---|
| 2,190,940 | A | * | 2/1940 | Frins | B67B 7/44 30/420 |
| 2,662,280 | A | * | 12/1953 | La Forte | B67B 7/32 30/420 |
| D548,552 | S | * | 8/2007 | Elkaim | D22/199 |
| D658,956 | S | * | 5/2012 | Welch | D8/18 |
| D687,687 | S | * | 8/2013 | Nelson | D8/14 |
| 2011/0296955 | A1 | * | 12/2011 | Silvers | B67B 7/44 81/3.09 |

* cited by examiner

*Primary Examiner* — Stephen Vu

(74) *Attorney, Agent, or Firm* — Brainstorm Patents; Robin Lopez

(57) ABSTRACT

A leveraging can holder enables secure retention of a paint can, and performs multiple functions pertinent to the can. The can holder has a sufficiently elongated and rigid composition, such that a leveraging effect can be applied on the can for supporting the can and performing functions to the can that require leveraging. Different regions of the can holder pivotally engage the can, enabling the can holder to brace against the side of the can to create a rigid support for holding the can. Thus, it is possible to support the can with one hand while manipulating the contents of the can with a second hand. The can holder pivots relative to the can to form three centers of rotation along its length, like a lever. The can holder has variously sized and dimensioned flanges, holes, and extensions that also use leveraging forces to perform functions.

13 Claims, 3 Drawing Sheets

MULTIPURPOSE LEVERAGING PAINT CAN HOLDER

FIELD OF THE INVENTION

The present invention relates generally to a can holder. More so, a multipurpose leveraging paint can holder which exerts a leveraging effect against a paint can to form a supportive brace for holding the can from the side, and to perform functions on or near the paint can.

BACKGROUND OF THE INVENTION

The following background information may present examples of specific aspects of the prior art (e.g., without limitation, approaches, facts, or common wisdom) that, while expected to be helpful to further educate the reader as to additional aspects of the prior art, is not to be construed as limiting the present invention, or any embodiments thereof, to anything stated or implied therein or inferred thereupon.

It is recognized that a paint is any liquid, liquefiable, or mastic composition that, after application to a substrate in a thin layer, converts to a solid film. It is most commonly used to protect, color, or provide texture to objects. Paint is generally stored in a cylindrical, one-gallon can. The density and low viscosity of the paint often makes the paint can heavy and cumbersome to carry around. Additionally, the handle on the paint can hinges, thus creating an unstable container full of a heavy material. Thus, the paint can may be difficult to maneuver while simultaneously painting.

In many instances, painting a surface involves simply accessing the paint directly from the one-gallon paint can by dipping a brush therein. This direct access may be necessary because a smaller container is not available, or pouring the paint in the smaller container is problematic. In this manner, the paint can must be carried while painting. So generally, either both hands are used for painting, or both hands are used for holding the paint can. But the heavier composition of a one-gallon paint can does not allow for simultaneous painting and support of the paint can.

The use of paint cans typically requires special tools, such as a planar bar to effect a lid opening, and a hammer to effect closure of the lid relative to the paint container. Typically, leveraging devices have been used for removing lids from containers such as paint cans. Most of these devices are flat and thin-bladed metal objects that are used to pry lids from the metal sealing channel of the paint can. Often, the leveraging effect is not maximized because the fulcrum is not held steady, or the gripping surface is not comfortable to grasp.

It is known that while painting, many pertinent tasks are required. For example, nails must be removed from walls before painting. Also, the older paint must be scraped off the wall. Not to mention taking a soda break from the painting project may require looking around for a bottle opener. Consequently, accessing a different tool for each paint related function can be time consuming.

Even though the above paint can holders address some of the needs of the market, a paint can holder that maximizes a leveraging effect for bracing the holder against the side of the paint can, while also performing multiple functions related to the paint can and painting process is needed.

SUMMARY OF THE INVENTION

This invention is directed towards a multipurpose leveraging can holder that is defined by an elongated and rigid configuration, such as a lever. The can holder creates a leveraging effect against the side of the can to form a secure, controllable brace for holding and manipulating the can. The leveraging effect is also utilized in different regions of the can holder to perform functions on or near the can, such as prying, scraping, and gripping.

The can holder engages and pivots relative to the can to form three centers of rotation that work together in much the same way as a lever to amplify support of the can. The can holder also has variously sized and dimensioned flanges, openings, and projections that also use leveraging forces to perform multiple functions that are pertinent to the can. In one embodiment, the can holder may be effective for holding and manipulating a one gallon paint can. However, any can having a substantially cylindrical shape and carrying contents that might be accessed while holding and manipulating the can with another hand may also be used.

In some embodiments, the can holder pivotally forms a first rotation point that serves as a fulcrum, engaging the side of the can. From the first rotation point, the can holder pivots and braces against the side of the can to create a rigid support for carrying and accessing the can. In this manner, it is possible to support the can with one hand while manipulating the contents of the can with a second hand.

The second rotation point is the surface used to support the can at its can handle. In some embodiments, the can handle pivots in relation to the can, and the second rotation point pivots against the first rotation point. These double pivoting motions enhance controllability of the can through the can holder, as a user can then pivot the can holder between a supportive brace against the side of the can, and an extended handle that the can hangs from.

The third rotation point is a gripping surface where linear force is applied to pivot the first and second centers of rotation. The third rotation point may also be used to manipulate the can holder to perform multiple functions on the can. In either case, the leveraging effect amplifies the force applied on the third rotation point.

In some embodiments, the can holder comprises various openings, sharp edges, extensions, and flanges that enable multiple functions to the paint can and the painting process by using much the same leveraging mechanisms used to hold the can. In one embodiment, the can holder has edges that are sufficiently wide and sharp so as to pry a lid from the can, or a cap from a bottle. The can holder also has variously sized and dimensioned openings, which can be used to grip and pry a nail or fastener. Various flanges and projections extend outwardly from the surfaces of the can opener, forming scrapers.

A first aspect of the present invention provides a can holder for exerting a supportive leverage against a can and performing multiple functions related to the can, which comprises:

an elongated beam having a fulcrum end and a pry end, and a first edge and a second edge, the fulcrum end defined by an inwardly curved periphery configured to form a first rotation point, the fulcrum end comprising an aperture at least partially defined by a projection, the fulcrum end further composing at least two pairs of adjacent support members extending laterally from the first and second edges, the at least two pairs of adjacent support members configured to form a second rotation point, the pry end defined by a flanged periphery configured to form a third rotation point, the pry end comprising a substantially tear drop shaped opening, the first and second edges at least partially defined by a first grip flange and a second grip flange, the first grip flange and the second grip flanges disposed substantially perpendicular to the beam, the first and second grip flanges configured to form a third rotation point.

In a second aspect, the can holder is configured to support a paint can.

In another aspect, the beam has a substantially planar shape.

In yet another aspect, the inwardly curved periphery is sized and dimensioned to contour the can.

In yet another aspect, the aperture is configured to enable passage of a cap from a bottle for removing the cap.

In yet another aspect, the projection is configured to scrape a paint roller.

In yet another aspect, the at least two pair of adjacent support members are configured to support a can handle.

In yet another aspect, the flanged periphery is configured to remove a can lid from the can.

In yet another aspect, the first and second grip flanges form a generally triangular shape.

In yet another aspect, the first and second grip flanges are configured to be operable to be gripped by a hand.

In yet another aspect, the can holder is fabricated from stamped metal.

One objective of the present invention is to enable a painter to hold a paint can with one hand, while painting with the second hand.

Another objective is to amplify the force used to support the can through a leveraging mechanism.

Another objective is to create a mechanical lever against the can to provide stringer support, especially when the can is heavy.

Another objective is to absorb the weight of the can against the beam and the fulcrum end, rather than against a hand.

Another objective is to provide a simple, lever that offers multiple functions on the can and the can contents.

Yet another objective is to scrape paint from a paint roller and a wall with the can holder.

Yet another objective is to remove bottle caps with the can holder.

Yet another objective is to remove nails with the can holder.

Yet another objective is to provide a comfortable grip on the first and second grip flanges.

These and other advantages of the invention will be further understood and appreciated by those skilled in the art by reference to the following written specification, claims and appended drawings.

BRIEF DESCRIPTION OF THE DRAWINGS

The invention will now be described, by way of example, with reference to the accompanying drawings, in which:

FIG. 1A is an upper view, and FIG. 1B is a lower view, in accordance with an embodiment of the present invention;

FIG. 2A is an upper view, and FIG. 2B is a lower view, in accordance with an embodiment of the present invention;

FIG. 3A is a view from a fulcrum end, and FIG. 3B is a view from a pry end, in accordance with an embodiment of the present invention; FIG. 4A is a left view and FIG. 4B is a right view, in accordance with an embodiment of the present invention.

Like reference numerals refer to like parts throughout the various views of the drawings.

DETAILED DESCRIPTION OF THE INVENTION

Figure 1A:
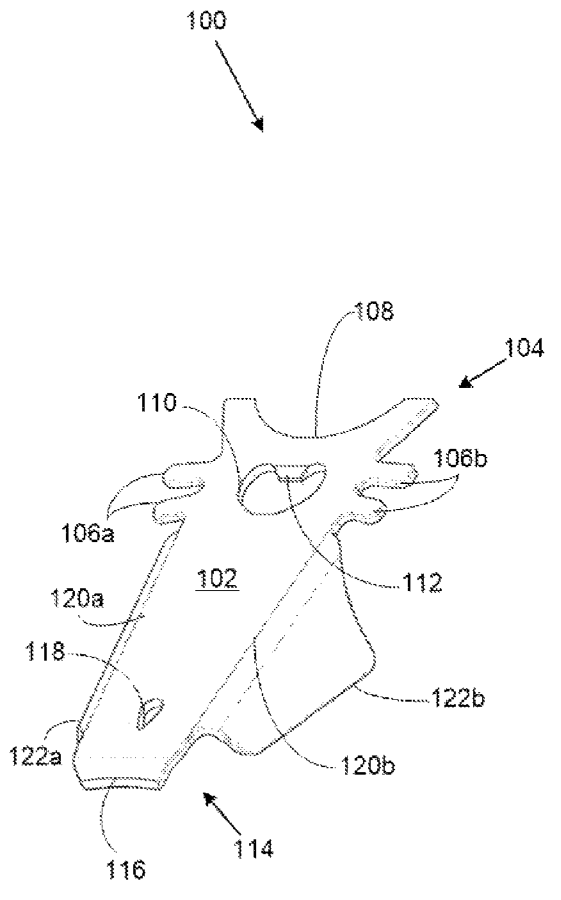
FIGS. 1A and 1B illustrate perspective views of an exemplary multipurpose leveraging pain can holder, where

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims. For purposes of description herein, the terms "upper," "lower," "left," "rear," "right," "front," "vertical," "horizontal," and derivatives thereof shall relate to the invention as oriented in FIG. 1A. Furthermore, there is no intention to be bound by any expressed or implied theory presented in the preceding technical field, background, brief summary or the following detailed description. It is also to be understood that the specific devices and processes illustrated in the attached drawings, and described in the following specification, are simply exemplary embodiments of the inventive concepts defined in the appended claims. Hence, specific dimensions other physical characteristics, and materials relating to the embodiments disclosed herein are not to be considered as limiting, unless the claims expressly state otherwise.

FIGS. 1A-4B illustrates a multipurpose leveraging can holder 100 that is designed to securely hold a can (not shown) from the side, and perform multiple functions on or near, and pertinent to the can. In some embodiments, the can holder 100 may be defined by an elongated and rigid configuration, such as a lever. The can holder creates a leveraging effect against the side of the can to form a secure, controllable brace for holding and manipulating the can. The leveraging effect is also utilized in different regions of the can holder to perform functions for the can, such as prying, scraping, and gripping.

The leveraging effect serves to amplify the force used to support the can and perform the functions. Specifically, different regions of the can holder 100 pivotally engage the side and handle of the can, enabling the can holder 100 to brace against the side of the can to create a rigid support for carrying and manipulating the can. In this manner, it is possible to support the can with one hand while accessing the contents of the can with a second hand. The leveraging effect is also applied to individual regions of the can holder 100 to perform a variety of function on the can.

In some embodiments, the can holder 100 engages and pivots relative to the can to form three centers of rotation along its length that work together in much the same way as a lever to amplify support of the can. A first rotation point forms a pivot against the side of the can. A second rotation point supports a portion of the can, such as a pivoting can handle. A third rotation point is where the initial force is applied to pivot the first and second points of rotation, and thus create the leveraging effect. Additionally, different regions of the can holder 100 create individual leveraging effects to perform multiple functions for the can.

The can holder 100 has variously sized and dimensioned flanges, holes, and extensions that also use leveraging forces to perform multiple functions for the can by using much the same leveraging mechanisms used to support and hold the can. In one embodiment, the can holder 100 has terminal edges that are sufficiently wide and sharp so as to pry a lid from the can, or a cap from a bottle. The can holder 100 also has variously sized and dimensioned holes, which can be used to grip and pry a nail or bottle cap. Furthermore, various flanges and extensions extend outwardly from the surfaces of the can opener, forming scrapers.

For purposes of this present invention, the can may include, without limitation, a paint can, a can of chemicals, a can of food or beverage, and a substantially cylindrically shaped container. In one embodiment, the can holder 100 may be effective for holding and manipulating a one gallon paint can. However, any can having a substantially cylindrical shape and carrying contents that might be accessed while holding and manipulating the can with a second hand may also be used.

FIG. 1A references the can holder 100 having an elongated beam 102. The beam 102 comprises a fulcrum end 104 and a pry end 114 that define the length of the beam 102. The beam 102 also comprises a first edge 120*a* and a second edge 120*b* that define the width of the beam 102. The beam 102 forms a generally planar surface and is sufficiently rigid to support the weight of at least a one gallon can of paint. In one embodiment, the beam 102 tapers from the fulcrum end 104 towards the pry end 114 to further amplify the leveraging effect. Suitable materials for fabrication of the beam 102 may include, without limitation, stamped metal, rigid polymers, and acrylics.

Figure 1B:
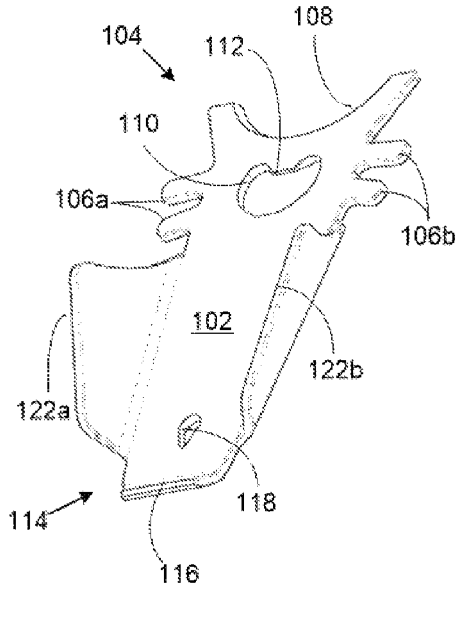

As shown in FIG. 1B, the fulcrum end 104 is defined by an inwardly curved periphery 108. The curved periphery 108 forms the fulcrum for the leveraging effect, and is sized and dimensioned to contour the side of the can. In this manner, a flush surface is formed against the side of the can to maximize the transfer of force against the fulcrum, and thus, the first rotation point is formed. The can holder 100 pivotally forms the first rotation point that serves as a fulcrum, engaging the side of the can. From the first rotation point, the can holder 100 pivots and braces against the side of the can to create a rigid support for holding and manipulating the can.

Figure 2A:
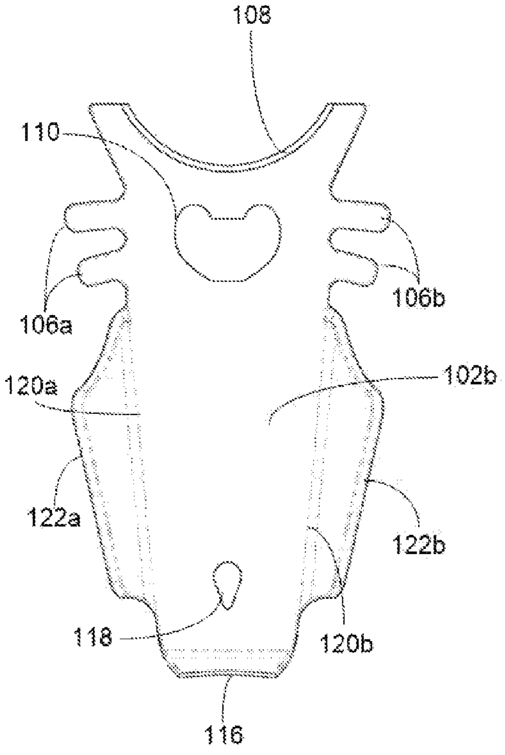
FIGS. 2A and 2B illustrate top views of an exemplary multipurpose leveraging pain can holder, where
Figure 2B:
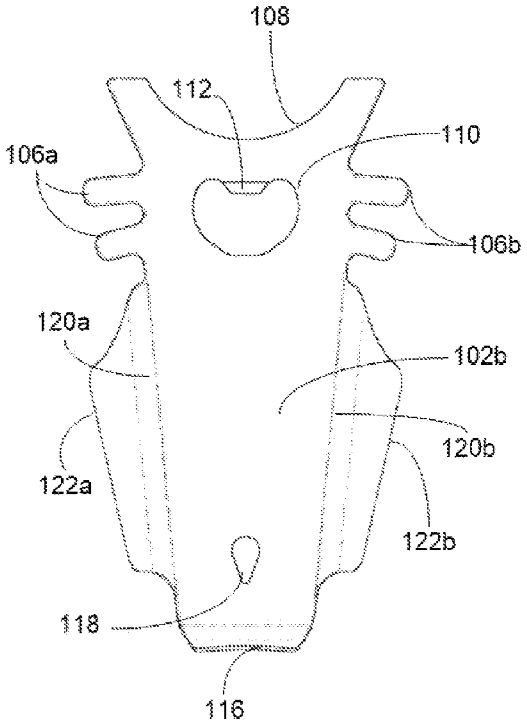

Turning now to FIGS. 2A and 2B, the fulcrum end 104 comprises an aperture 110 that is at least partially defined by a projection 112. The aperture 110 may have a semicircle shape. The projection 112 may slightly angle away from the plane of the aperture 110. In some embodiments, the aperture 110 and the projection 112 work together to pry a bottle cap from a bottle. In this function, the pry end 114 is pivoted against the projection 112, which serves as a fulcrum, to remove the cap from the bottle. Additionally, since the projection 112 is slightly angled, the projection 112 is effective in lifting paint from a surface, such as a paint roller or a wall. In one embodiment, the projection 112 may be used to scrape corners, or to remove a portion of popcorn ceiling to provide a smooth painting corner line.

Figure 3A:
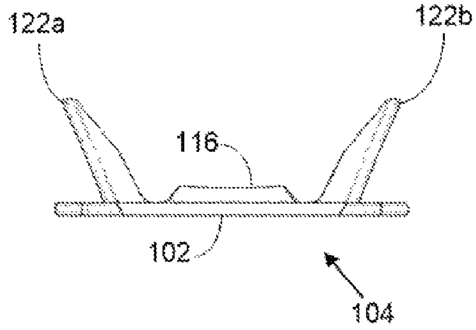
FIGS. 3A and 3B illustrate elevated end views of an exemplary multipurpose leveraging pain can holder, where

As illustrated by the end view of FIG. 3A, the fulcrum end 104 further comprises at least two pairs of adjacent support members 106*a*, 106*b* extending laterally from the first and second edges 120*a*, 120*b*. Each pair of support members 106*a*, 106*b* may form a double hump shape with a gap forming between each hump. The can handle rests securely in the gap, and may pivot accordingly therein. The support members 106*a*, 106*b* are configured to form the second rotation point as the can handle pivots relative to the can while riding the gap between the support members 106*a*, 106*b*. Additionally, the support members 106*a*, 106*b* may also be used to scrape corners, hammer a lid on the can, or to create a smooth painting corner line.

Figure 3B:
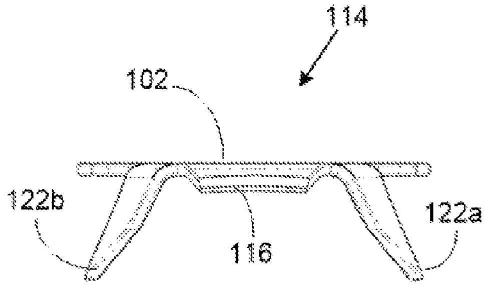

As illustrated by the end view of FIG. 3B, the pry end 114 is defined by a flanged periphery 116. The flanged periphery 116 may also have a slightly angled orientation that deviates from the plane of the beam 102. The flanged periphery 116 may have a hard, beveled edge that is efficacious for scraping paint and other debris from a surface. The pry end 114 can also be effective for prying lids from the metal sealing channel of the can. Unlike traditional paint can openers, the greater surface area of the pry end does not cause damage to paint can lids while prying. Additionally, the curvature of the pry end is such that In one embodiment, an upward force is applied to the fulcrum end 104 causing the flanged periphery 116 to act as a fulcrum.

Additionally, the pry end 114 comprises a substantially tear drop shaped opening 118. In one embodiment, the shape of the opening 118 is effective for encircling the head of a nail. The nail may then be pried off through a leveraging effect, whereby an upward force is applied to the fulcrum end 104 and an inner surface of the opening 118 forms the fulcrum against the nail.

Figure 4A:
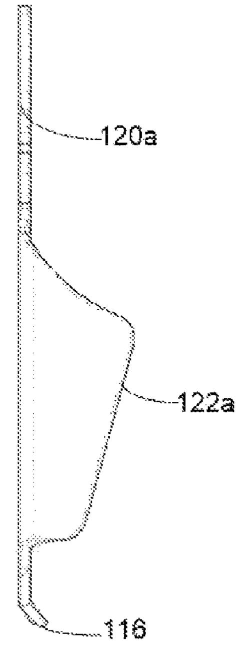
FIGS. 4A and 4B illustrate elevated side views of an exemplary multipurpose leveraging pain can holder, where
Figure 4B:
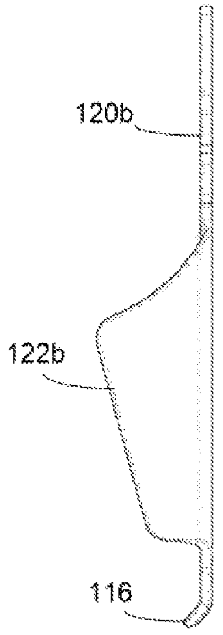

Turning now to FIGS. 4A and 4B, the first edge and the second edge 120*a*, 120*b* are at least partially defined by a first grip flange 122*a* and a second grip flange 122*b*. The first and second grip flanges 122*a*, 122*b* may form a symmetrical extension perpendicular to the beam 102. In one embodiment, the first and second grip handles form a substantially triangular shape. The first grip flange 122*a* and the second grip flange 122*b* are configured to be operable to be gripped by a hand, in essence serving as handles for operation of the can holder 100. Since the force used to brace the can holder 100 against the can is applied at the first and second grip flanges 122*a*, 122*b* form the third rotation point.

In operation, the can holder 100 pivotally forms a first rotation point that serves as a fulcrum, engaging the side of the can. The curved periphery 108 of the fulcrum end 104 is sized and dimensioned to contour the side of the can so as to maximize the efficiency of the leveraging effect. From the first rotation point, the can holder 100 pivots and braces against the side of the can to create a rigid brace for holding and manipulating the can or the contents therein. In this manner, it is possible to support the can with one hand while manipulating the contents of the can with a second hand. And thus, the weight of the can is absorbed against the beam 102 and the fulcrum end 104, rather than against a hand.

The second rotation point is the surface used to support the can at the can handle. In some embodiments, the can handle pivots in relation to the can, and the second rotation point pivots against the first rotation point. These double pivoting motions enhance controllability of the can through the can holder 100, as a user can then pivot the can holder 100 between the formed supportive brace against the side of the can, and an extended handle that the can hangs from. The at least two pairs of adjacent support members 106*a*, 106*b* are where the second rotation point occurs. Each pair of support members 106*a*, 106*b* may form a double humped shape with a gap forming between each support member. The can handle fits in the gap, and may pivot accordingly therein.

The third rotation point is a gripping surface where linear force is applied to the at least two pair of support members 106*a*, 106*b* for pivoting the first and second centers of rotation. The third rotation point may also be used to manipulate the can holder 100 to perform multiple functions on the can. In either case, the leveraging effect amplifies the force applied on the third rotation point.

Since many modifications, variations, and changes in detail can be made to the described preferred embodiments of the invention, it is intended that all matters in the foregoing description and shown in the accompanying drawings be interpreted as illustrative and not in a limiting sense. Thus, the scope of the invention should be determined by the appended claims and their legal equivalence.

What I claim is:

1. A can holder for exerting a leveraging effect against a can, the can holder comprising:

an elongated beam having a fulcrum end and a pry end, and a first edge and a second edge, the beam defined by a substantially planar shape that tapers from the fulcrum end to the pry end, the fulcrum end defined by an inwardly curved periphery configured to form a first rotation point, the fulcrum end comprising an aperture at least partially defined by a projection, the pry end defined by a flanged periphery configured to form a third rotation point, the pry end comprising an opening, the first and second edges at least partially defined by first and second grip flanges, respectively configured to form a second rotation point.

2. The holder of claim 1, wherein the can holder is configured to support and manipulate a paint can.

3. The holder of claim 1, wherein the inwardly curved periphery is sized and dimensioned to contour the can.

4. The holder of claim 1, wherein the aperture is configured to enable passage of a cap from a bottle for removing the cap.

5. The holder of claim 1, wherein the aperture forms a substantially semicircular shape.

6. The holder of claim 1, wherein the projection is configured to scrape a paint roller.

7. The holder of claim 1, wherein the at least two pair of adjacent support members are configured to support a can handle.

8. The holder of claim 1, wherein the opening has a substantially tear drop shape.

9. The holder of claim 1, wherein the flanged periphery is configured to remove a can lid from the can.

10. The holder of claim 1, wherein each of the first and second grip flanges separate triangular shape.

11. The holder of claim 1, wherein the first and second grip flanges are configured to be operable to be gripped by a hand.

12. The holder of claim 1, wherein the can holder is fabricated from stamped metal.

13. The holder of claim 1, wherein the fulcrum end and the pry end are a unitary piece of material.

* * * * *